United States Patent Office 3,097,944
Patented July 16, 1963

3,097,944
HERBICIDAL METHOD
John A. Riddell and Bogislav von Schmeling, both of Hamden, Conn., assignors to United States Rubber Company, New York, N.Y., a corporation of New Jersey
No Drawing. Filed Oct. 12, 1961, Ser. No. 144,576
12 Claims. (Cl. 71—2.5)

This invention relates to herbicides.

We have found that N-phenylitaconimide, N-(methylphenyl)itaconimides, N-(dimethylphenyl)itaconimides, N-(methoxyphenyl)itaconimides and N-(chlorophenyl)-itaconimides are effective herbicides.

The chemicals of the present invention may be applied to the soil before emergence of weeds as pre-emergence herbicides. They may also be applied as post-emergence herbicides to weeds growing in soil. The chemicals may be applied as dusts when admixed with a powdered solid carrier, such as various mineral silicates, e.g., mica, talc, pyrophillite and clays. The chemicals may be mixed with surface-active dispersing agents, as herbicidal concentrates, to facilitate dispersing in water and to improve the wetting properties when used as sprays. If desired, the chemicals may be mixed with a powdered solid carrier together with a surface-active dispersing agent so that a wettable powder may be obtained which may be applied directly, or which may be shaken up with water to make an aqueous dispersion for application in that form. The chemicals may be dissolved in a solvent such as acetone or benzene or an oil such as a hydrocarbon or chlorinated hydrocarbon oil, and the solution of the chemical dispersed in water with the aid of a surface-active dispersing agent to give a sprayable aqueous dispersion. Such surface-active dispersing agents may be anionic or non-ionic or cationic surface-active agents. Such surface-active agents are well known and reference is made to Hoffman et al. U.S. Patent No. 2,614,916, columns 2 to 4, for detailed examples of the same. The chemicals of the present invention may be applied by the aerosol method. Solutions for the aerosol treatment may be prepared by dissolving the chemical directly in the aerosol carrier which is a liquid under pressure but which is a gas at ordinary temperature (e.g. 20° C.) and atmospheric pressure, or the aerosol solution may be prepared by first dissolving the chemical in a less volatile solvent and then admixing such solution with the highly volatile liquid aerosol carrier. The chemicals may be applied to the soil at rates of 1 to 20 pounds per acre.

The N-aryl itaconimides (i.e. the N-phenyl and the N-(substituted phenyl)itaconimides) are prepared by reacting the selected aromatic primary monoamine with itaconic anhydride to form the N-aryl itaconamic acid which is reacted with acetic anhydride and sodium acetate to form the N-aryl itaconimide.

Illustrative preparations of the chemicals are described below.

N-phenylitaconimide was prepared as follows:

To a solution of 22.4 grams of itaconic anhydride in a small amount of benzene was added 18.8 grams of aniline in a little benzene. A precipitate immediately formed and after the mixture was stirred for a few minutes the precipitate of N-phenylitaconamic acid was filtered off, washed with benzene and air dried to yield 40 grams of light colored solid. Recrystallization from dioxane gave a white solid, M.P. 165–167° C.; percent N, found 6.76%, theory 6.82%; neutral equivalent, found 205, theory 204.

One hundred grams of the N-phenylitaconamic acid, 16 grams of sodium acetate and 300 grams of acetic anhydride were heated to 90° C. for one-half hour then poured into cold water to yield 69 grams of a brown tacky solid. This was extracted with cyclohexane and the extract concentrated and cooled to yield 29 grams of white solid, M.P. 85–115° C. This N-phenylitaconimide was recrystallized from 95% ethanol several times to yield 16 grams of a white solid, M.P. 120–122° C.; percent N, found 7.59%, theory 7.51%.

N-(3-methylphenyl)itaconimide was prepared as follows:

To a solution of 112 grams of itaconic anhydride in 1250 ml. of benzene was slowly added, with stirring, a solution of 107 grams of n-toluidine in 500 ml. of benzene at room temperature. The resultant thick paste was stirred for 2 hours; thereafter filtered, washed with benzene and air dried to yield 222 grams of the N-(3-methylphenyl)itaconamic acid as a white powder. A sample recrystallized from 50% (by volume) aqueous acetone melted at 158–159° C.; percent N, found 6.1%, theory 6.4%.

A mixture comprising 109.5 grams of the above N-(3-methylphenyl)itaconamic acid, 21 grams of anhydrous sodium acetate, 56.1 grams of acetic anhydride and 500 ml. of acetone was heated to reflux for one hour; thereafter cooled and filtered to remove undissolved sodium acetate. The filtrate was concentrated in vacuo at 50° C. to yield a viscous oil, which upon cooling became a waxy solid. This was taken up in benzene which left a polymeric material undissolved. The benzene solution was evaporated to dryness; the residue taken up in 250 ml. of hot isopropanol. Addition of water to this hot solution until a slight opalescence appeared and thereafter cooling precipitated 32 grams of the desired N-(3-methylphenyl)-itaconamide as pale yellow crystals melting at 74–75° C.; percent N, found 6.9%, theory 7.0%.

N-(2,6-dimethylphenyl)itaconimide was prepared as follows:

To 66 grams of itaconic anhydride in 2 liters of benzene was added 59.5 grams of 2,6-dimethylaniline in 500 ml. of benzene. The mixture was heated to reflux for ½ hour. The precipitate of N-(2,6-dimethylphenyl)-itaconamic acid which formed was filtered off, washed with benzene and dried to yield 72 grams. Recrystallization from tetrahydrofuran/benzene 50/50 by volume gave 53 grams of white solid, M.P. 195° C.; percent N, found 5.86%, theory 5.96%; neutral equivalent, found 233, theory 234.

Thirty one grams of the N-(2,6-dimethylphenyl)-itaconamic acid, 6 grams of sodium acetate and 140 grams of acetic anhydride was heated to 90–100° C. for 30 minutes and then poured into cold water. The crude solid was extracted with cyclohexane and the extract worked up to yield 21 grams of light yellow solid, M.P. 90–128° C. After several recrystallizations of the N-(2,6-dimethylphenyl)itaconimide from ethanol and from cyclohexane, there was obtained 10 grams of nearly white solid, M.P. 129–131° C.; percent N, found 6.62%, theory 6.51%.

N-(4-methoxyphenyl)itaconimide was prepared as follows:

To a solution of 112 grams of itaconic anhydride in 1500 ml. of benzene was slowly added at room temperature, with stirring, a solution of 123 grams of p-methoxyaniline, in 500 ml. of benzene. The resultant white solid was filtered, washed with benzene and air dried to yield 239 grams of N-(4-methoxyphenyl)itaconamic acid as a white solid melting at 167–168° C. A sample recrystallized from 50% aqueous acetone (by volume) melted at 171–172° C.; percent N, found 5.9%, theory 5.9%.

A mixture of 118 grams of the above N-(4-methoxyphenyl)itaconamic acid, 21 grams of anhydrous sodium acetate and 500 ml. of acetic anhydride was heated to 70° C. for one hour and thereafter cooled and stirred into 3.5 liters of water. The precipitated solids were composed of 19 grams of light yellow solid and 95 grams of a dark brown lumpy solid. The former was separated by decantation, filtered, and recrystallized from isopropanol to yield 16 grams of the desired N-(4-methoxyphenyl)-itaconimide as yellow crystals melting at 113–114° C.; percent N, found 6.3%, theory 6.5%.

N-(4-chlorophenyl)itaconimide was prepared as follows:

To a solution of 66 grams of itaconic anhydride in 2 liters of bezene gradually was added, at room temperature and with stirring, 63.5 grams of a solution of p-chloroaniline in 500 ml. of benzene. Within a few minutes the N-(4-chlorophenyl)itaconamic acid (96 grams) precipitated as a white solid, melting at 175–185° C., and was filtered off, washed with benzene and air dried. It was purified by recrystallization from a 50/50 (by volume) mixture of tetrahydrofuran and benzene to give the product as a white solid, M.P. 191–193° C.; percent N, found 5.87%, theory 5.85%; neutral equivalent, found 239, theory 239.

Thirty grams of the above pure N-(4-chlorophenyl)-itaconamic acid, 5 grams of sodium acetate and 75 grams of acetic anhydride were heated to about 100° C. for one half hour. The resulting brown solution, containing a little undissolved sodium acetate, was poured into 500 ml. of water to precipitate a friable solid. This solid was filtered off and the wet cake taken up in hot cyclohexane, concentration and cooling of the cyclohexane solution gave 19 grams of white solid, melting at 90–133° C. After several recrystallizations from ethanol there was obtained 9 grams of the desired N-(4-chlorophenyl)-itaconamide as a white solid, M.P. 133–135° C.; percent N, found 6.21%, theory 6.33%, percent chlorine, found 14.78%, theory 15.56%.

The following examples illustrate the invention. All parts and percentages referred to herein are by weight.

Example 1

This example illustrates the pre-emergence activity of the chemicals of the present invention.

Aqueous suspensions of 500 parts per million (p.p.m.) of various chemicals of the present invention were prepared by dissolving 0.1 gram of the chemical in 10 ml. of acetone, mixing therewith one drop (about 0.07 ml.) of a non-herbicidal surface-active agent (polyoxyethylene sorbitan monooleate), and adding the mixture to 190 ml. of water. Six inch plastic test pots were prepared by filling to within an inch from the top with 1:1 sand-soil mixture. A 0.5 gram weight of weed seeds were spread evenly over the soil surface in each pot, and this was then covered with 1/8" thickness of the sand-soil mixture. The weed seeds included three grassy weeds, viz. crabgrass (*Digitaria ischaemum*), barnyard grass (*Echinochloa crusgalli*), and foxtail (*Setaria glauca*), and five broadleaf weeds, viz. pigweed (*Amaranthus retroflexus*), purslane (*Portulaca oleracea*), quickweed (*Galinsoga ciliata*), ragweed (*Ambrosia artemisiifolia*), and lambsquarters (*Chenopodium album*). Eighty ml. of the aqueous suspensions of the chemicals were watered on the surface of the various test pots prepared as above. This gave an application rate of the chemicals of about 20 pounds per acre. Checks were run with water and with water containing the same amount of acetone and surface-active agent as in the above preparations. The pots were placed in the greenhouse and watered daily from the bottom or as often as required to keep the soil surface moist.

Three weeks after planting, the treatments were evaluated for percent weed control of both the grassy and broadleaf weeds, on the basis of 0% control for the checks (the weed growth was the same for the water and the water containing the acetone and surface-active agent) and 100% control for complete absence of weeds.

The following table shows the weed control of the grassy weeds and the broadleaf weeds by the chemicals of the peresent invention.

| Chemical | Percent Weed Control | |
| --- | --- | --- |
| | Grassy | Broadleaf |
| N-phenylitaconimide | 88 | 88 |
| N-(3-methylphenyl)itaconimide | 85 | 85 |
| N-(2,6-dimethylphenyl)itaconimide | 87 | 95 |
| N-(2-methoxyphenyl)itaconimide | 70 | 90 |
| N-(3-chlorophenyl)itaconimide | 95 | 100 |
| N-(4-chlorophenyl)itaconimide | 100 | 100 |

Example 2

This example illustrates the post-emergence activity of the chemicals of the present invention.

Aqueous suspensions of 2000 p.p.m. of various chemicals of the present invention were prepared by dissolving 0.5 gram of the chemical in 20 ml. of acetone, mixing therewith three drops (about 2 ml.) of a non-herbicidal surface-active agent (polyoxyethylene sorbitan monooleate), and adding the mixture to 230 ml. of water.

Boxes 4" x 4" x 4" were filled to within one-half inch of the top with a 1:1 sand-soil mixture. A 0.5 gram weight of weed seeds was spread evenly over the soil surface in each box and this was covered with 1/8" thickness of the sand-soil mixture. The weed seeds were the same as described for the pre-emergence herbicide, Example 1 above. The germinating seeds were maintained under a 16-hour day length and a temperature of 75° F. for from 10 to 14 days. At time of chemical treatment, the broadleaf species were 1½" tall and the grassy species had leaves 4" to 5" long.

Duplicate boxes of the emerged weeds were sprayed to runoff with 2000 p.p.m. aqueous suspensions. This gave an application rate of the chemicals of 4 lbs. per acre. Checks were run with water and with water containing the same amount of acetone and surface-active agent as in the above preparations. The boxes were returned to the greenhouse and watered daily from the bottom or as often as required to keep the soil surface moist. Ten days after chemical treatment, the chemicals were evaluated for percent weed control of both the grassy and broadleaf weeds, on the basis of 0% control for the checks (the weed growth was the same for the water and the water containing the acetone and surface-active agent) and 100% control for complete absence of weeds.

The following table shows the weed control of the grassy weeds and the broadleaf weeds by the chemicals of the present invention.

| Chemical | Percent Weed Control | |
| --- | --- | --- |
| | Grassy | Broadleaf |
| N-phenylitaconimide | 95 | 93 |
| N-(3-methylphenyl)itaconimide | 100 | 100 |
| N-(4-methylphenyl)itaconimide | 87 | 95 |
| N-(2-methoxyphenyl)itaconimide | 95 | 93 |
| N-(2-chlorophenyl)itaconimide | 98 | 95 |

This application is a continuation-in-part of application Serial No. 86,315, filled February 1, 1961, now abandoned.

Having thus described our invention, what we claim and desire to protect by Letters Patent is:

1. The method of controlling weeds in soil which comprises treating the soil before emergence of weeds with a herbicidal amount of a chemical selected from the group consisting of N-phenylitaconimide, N-(methylphenyl)itaconimides, N-(dimethylphenyl)itaconimides, N-(methoxyphenyl)itaconimides and N-(chlorophenyl)itaconimides.

2. The method of controlling weeds in soil which comprises treating the soil before emergency of weeds with a herbicidal amount of N-phenylitaconimide.

3. The method of controlling weeds in soil which comprises treating the soil before emergence of weeds with a herbicidal amount of N-(methylphenyl)itaconimide.

4. The method of controlling weeds in soil which comprises treating the soil before emergence of weeds with a herbicidal amount of an N-(dimethylphenyl)itaconimide.

5. The method of controlling weeds in soil which comprises treating the soil before emergence of weeds with a herbicidal amount of an N-(methoxyphenyl)itaconimide.

6. The method of controlling weeds in soil which comprises treating the soil before emergence of weeds with a herbicidal amount of an N-(chlorophenyl)itaconimide.

7. The method of destroying growing weeds in soil which comprises applying to the weeds a herbicidal amount of a chemical selected from the group consisting of N-phenylitaconimide, N-(methylphenyl)itaconimides, N-(dimethylphenyl)itaconimides, N-(methoxyphenyl)itaconimides and N-(chlorophenyl)itaconimides.

8. The method of destroying growing weeds in soil which comprises applying a herbicial amount of N-(methylphenyl)itaconimide to weeds.

9. The method of destroying growing weeds in soil which comprises applying a herbicidal amount of N-phenylitaconimide to weeds.

10. The method of destroying growing weeds in soil which comprises applying a herbicidal amount of an N-(dimethylphenyl)itaconimide to weeds.

11. The method of destroying growing weeds in soil which comprises applying a herbicidal amount of an N-(methoxyphenyl)itaconimide to weeds.

12. The method of destroying growing weeds in soil which comprises applying a herbicidal amount of an N-(chlorophenyl)itaconimide to weeds.

References Cited in the file of this patent

UNITED STATES PATENTS

| | | |
|---|---|---|
| 2,865,730 | Gates et al. | Dec. 23, 1958 |
| 2,900,243 | Lewis | Aug. 18, 1959 |